(No Model.)
F. LEWIS.
HARNESS CONNECTION FOR JACQUARD MECHANISM.
No. 561,801. Patented June 9, 1896.
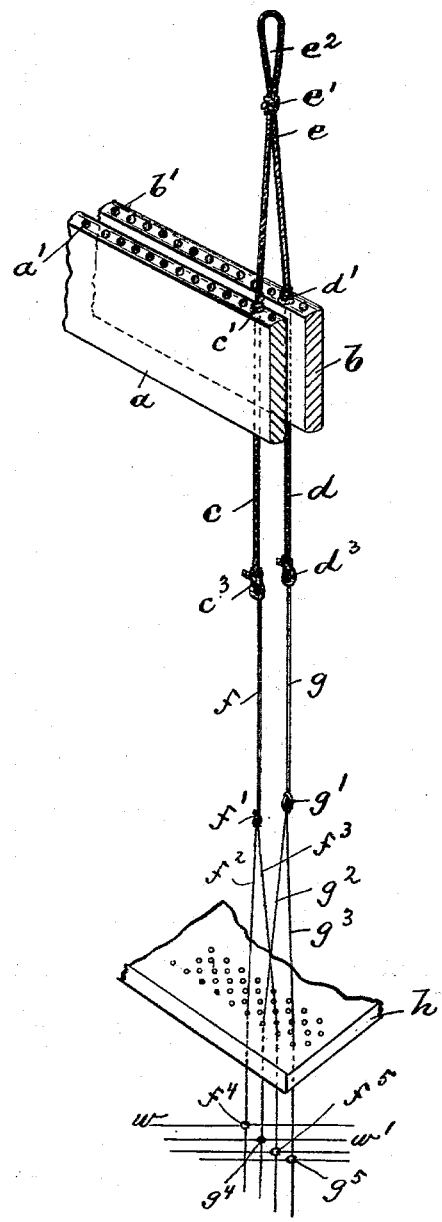
WITNESSES:
A. Faber du Faur
Duncan McRobertson.
INVENTOR:
Francis Lewis
BY Gartner &co
ATTORNEYS

UNITED STATES PATENT OFFICE.

FRANCIS LEWIS, OF PATERSON, NEW JERSEY.

HARNESS CONNECTION FOR JACQUARD MECHANISM.

SPECIFICATION forming part of Letters Patent No. 561,801, dated June 9, 1896.

Application filed January 23, 1896. Serial No. 576,545. (No model.)

*To all whom it may concern:*

Be it known that I, FRANCIS LEWIS, a subject of the Queen of Great Britain, residing in Paterson, Passaic county, and State of New Jersey, have invented certain new and useful Improvements in Harness Connections for Jacquard Mechanisms; and I do hereby declare the following to be a full, clear, and exact description of the invention, such as will enable others skilled in the art to which it appertains to make and use the same, reference being had to the accompanying drawing, and to letters of reference marked thereon, which forms a part of this specification.

The object of this invention is to provide a harness connection for Jacquard mechanism whereby the number of connecting-cords and knots and the number of holes in the frames or shafts are reduced to one-half.

The invention consists in the improved harness connection, and the combination and arrangement of parts, substantially as will be hereinafter more fully described, and finally embodied in the claim.

In the accompanying drawing, which illustrates in a detail perspective view my improved harness connection, $a$ and $b$ represent the shafts or frames, provided with vertical holes or openings $a'$ $b'$. In each set of said openings are arranged the downwardly-projecting ends $c$ and $d$ of the cord $e$, tied together about midway by means of the knot $e'$, and thus forming a loop $e^2$, by means of which latter said cord is connected to the hook of the Jacquard mechanism. (Not shown in the drawing.) The ends $c$ and $d$ are also provided above and below the frames $a$ and $b$ with knots $c'$ $d'$ and $c^3$ $d^3$, respectively, for regulating the distance of motion. To each of the knots $c^3$ and $d^3$ are secured two harness-threads $f$, (or $g$,) each set being knotted, as at $f'$, (or $g'$,) and terminating into and thus forming the harness-necks $f^2$ $f^3$, (or $g^2$ $g^3$,) adapted to pass through the compass-board $h$ and to cross each other, as clearly shown in the drawing. Below the compass-board are arranged the heddle-eyes $f^4$ $f^5$ and $g^4$ $g^5$, through which the warp-threads $w$ and $w'$ pass.

In operation the frames $a$ and $b$, carrying the looped and knotted cord $e$ and its respective harness-threads $f$ and $g$, are raised and lowered alternately, thereby raising and lowering the warp-threads $w$ $w$ or $w'$ $w'$, and thus allowing the shuttles to be thrown between said warp-threads.

From the foregoing it can be seen that each looped cord $e$ carries four harness-cords—that is to say, two on each of its depending ends—and that by this arrangement the number of harness-carrying cords, knots, &c., is reduced to one-half.

Having thus described my invention, what I claim as new, and desire to secure by Letters Patent, is—

In a loom, the combination with the parallel frames $a$, $b$ and the compass-board $h$, of a cord $e$ provided with a central loop and penetrating with its depending ends the two parallel frames, knots arranged on each depending end one above and one below the frame, and two harness-threads, provided with one intermediate knot, secured to each lower knot of the cord $e$, and terminating in and thus forming the harness-necks, which latter pass through the compass-board and cross each other above the same, all said parts, substantially as and for the purposes described.

In testimony that I claim the foregoing I have hereunto set my hand this 30th day of December, 1895.

FRANCIS LEWIS.

Witnesses:
ALFRED GARTNER,
DUNCAN M. ROBERTSON.